United States Patent Office 3,681,092
Patented Aug. 1, 1972

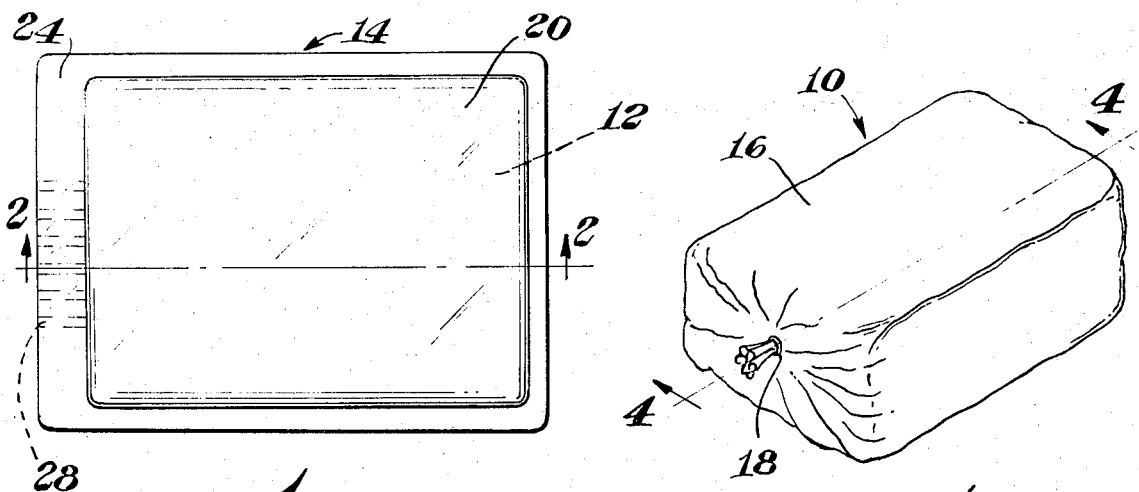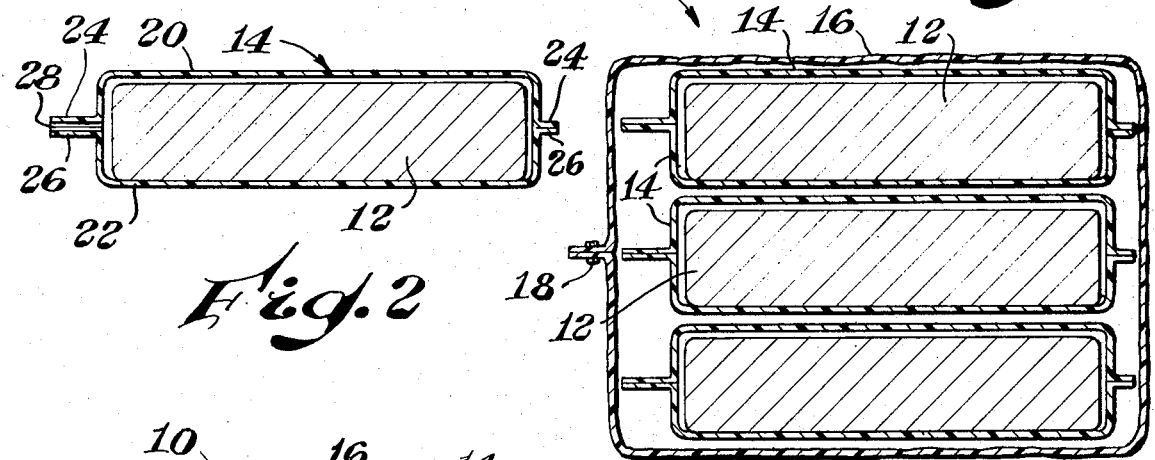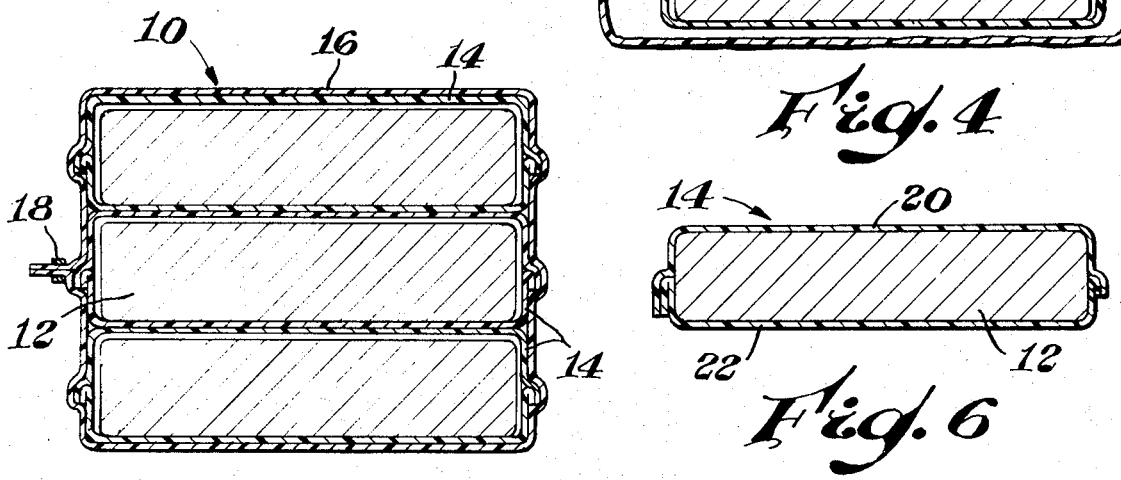

3,681,092
FRESH MEAT PACKAGING
Oliver R. Titchenal, Berea, Ohio, Almar T. Widiger, Midland, Mich, and Robert A. Yurcisin, Seven Hills, Ohio, assignors to The Dow Chemical Company, Midland, Mich.
Filed Oct. 25, 1968, Ser. No. 770,577
Int. Cl. B65b 25/06
U.S. Cl. 99—174                                    8 Claims

ABSTRACT OF THE DISCLOSURE

A system for packaging fresh meat before the meat reaches its retail outlet or commercial user. The fresh meat is inserted in an oxygen permeable plastic film pack, which pack is then placed into a substantially oxygen impermeable outer container. Both the packs and container are vacuumized in a one-step operation, an appropriate device on the outer container permitting such simultaneous evacuation. Preferably, the outer container is then shrunk to form a tight package. The completed package is then shipped to the retail store or restaurant where the outer container is removed when the meat product is ready to be displayed or used. The oxygen permeable packs can then be post shrunk to hasten oxidation of the meat to a red bloom and to improve the appearance of the packs.

DISCLOSURE OF THE INVENTION

In order for fresh red meat to maintain its highly desirable red color, it is necessary that it not be subjected to too little nor too much oxygen. The complete lack of oxygen results in fresh meat having an undesirable purplish red coloration. For example, comminuted meat, such as ground beef, is commonly prepackaged for shipment in Saran packages substantially in accordance with the teachings of U.S. Pats. Nos. Re. 24,992 and 2,831,302. However, since the Saran is substantially impermeable to significant oxygen penetration for long periods of time, an opaque printed film is used so that the actual purplish red color of the comminuted meat cannot be seen by the ultimate consumer. After the package is opened, the air reaches the meat and it blooms again to its bright red color.

However, many customers will not buy comminuted meat without first seeing the product. It is therefore desirable that a clear breathing film which will allow the meat to have its red color be used with prepackaged comminuted meat. But long continued oxidation of the myoglobin and oxymyoglobin in comminuted meats, like ground beef, results in the discoloring brown pigment metmyoglobin, the relative proportions of the different forms of pigments being dependent on the partial pressure of oxygen. Thus, too great a contact with oxygen results in a quickening of the discoloration of red meat products. Because of this situation, prepackaging of such meat before shipment in clear, breathing film has not yet achieved significant commercial utilization.

An attempt to try to solve the aforesaid problem of packaging fresh meat is taught by British Pat. No. 1,097,637 wherein inner pouches of highly oxygen permeable film material containing the meat are located within an outer sealed container of relatively low oxygen permeability. However, this teaching is deficient in many ways. For example, because the packages are relatively loosely formed about the meat, there is considerable distortion, during shipment, of the appearance of the retail cut. Likewise, because of the loose fit of the bags, any pin hole in the bag permits oxygen to permeate throughout the entire package, resulting in purging of large quantities of meat product. Furthermore, no adequate control of air within the packages is provided. In addition, the aforesaid British patent teaches that the meat is to be packaged in the red bloom state, thus resulting in an undesirable acceleration of the meat to the oxygenated state.

Accordingly, it is an object of the present invention to provide a two component packaging system wherein a tight outer container is employed thereby substantially eliminating distortion of the inner packs and their contained meat product during shipping, and localizing the effect of any pin holes in the outer container. It is a further object of the present invention to provide a two way system for air control allowing withdrawal of air out of the inner packs during the initial packaging while allowing oxygen to enter into the packs during the eventual exposure of the packs to the atmosphere. In addition, it is a further object of the invention to provide a packaging system wherein the meat, if immediately packaged after cutting from the carcass with minimum exposure to oxygen, experiences minimal conversion to the oxygenated state thereby lending increased potential to proper blooming to the oxygenated state when the meat is reexposed to air at the consumer or retail level.

Briefly, the present invention comprehends prepackaging of a quantity of fresh red meat, immediately after cutting from the carcass, in breathable film taking the form of packs or the like. Such prepackaging results in a plurality of individual packs which would then be inserted into a container for shipping and storage. Such a container would be formed of a material which is substantially impermeable to oxygen pentetration over extended periods of time, that is, for several weeks. Both the inner packs and outer container would be made of heat shrinkable materials so that the advantages as heretofore stated could be achieved. Prior to completion of the packaging operation, withdrawal of air from the inner packs and outer container simultaneously is achieved, preferably through a skip seal closure arrangement in the inner packs. After purging of the container and packs, the outer container is shrunk and shipped to a retail outlet. When ready for use, the inner packs are then removed from the outer container. The packs can then be post shrunk. The heat used in post shrinking of the packs will not only make them more attractive but will serve to increase the permeation of oxygen through the film skin of the packs, and therefore the oxygenation of the meat, to more quickly achieve the bright red bloom desired for marketing of the meat product at the consumer level.

Yet additional objects and advantages of the present invention are even more apparent when taken in conjunction with the accompanying drawing in which like characters of reference designate corresponding material and parts throughout the several views thereof, in which:

FIG. 1 is a top view of one embodiment of a pack constructed according to the principles of the present invention;

FIG. 2 is a cross-sectional view of the pack taken along line 2—2 of FIG. 1;

FIG. 3 is an isometric view, reduced in size, of a package comprised of a container containing a plurality of the aforesaid packs, in accordance with the principles of the present invention;

FIG. 4 is an enlarged cross-sectional view of the container taken along line 4—4 of FIG. 3;

FIG. 5 is a view like FIG. 4 only after the container is shrunk around its packs; and FIG. 6 is a view like FIG. 2 only after a pack is shrunk about its contents.

Referring now more particularly to the drawing, FIG. 1 illustrates a pack 14 containing comminuted meat 12, such as ground beef and the like. However, it is understood that meats other than those comminuted, like roasts, steaks, fresh ham, smoked ham, and the like which are subject to deterioration by excessive quantities of oxygen, can also comprise meat 12. Package 10 (FIG. 3) comprises two basic parts, namely a plurality of individual smaller packs 14 contained within a master shipping and storage container 16.

The container 16 is shown here in the form of a bag which is closed against gas penetration by a clip 18. Alternatively, container 16 can be adhesively or heat sealed by techniques well known in the art.

Packs 14, as best illustrated in FIG. 2, are here shown as flat packs having a peripheral seal, such as taught in U.S. Pat. No. 3,180,066. However, packs 14 can take other sizes and shapes as, for example, a film overwrap tray, such as shown in U.S. Pat. No. 3,151,799, provided an oxygen permeable film is employed. Each pack 14 is formed as a two component item having upper and lower components 20 and 22, respectively. Components 20 and 22 each have a peripheral flange mating with the flange of the other, these being designated as flanges 24 and 26, respectively, in FIG. 1. Flanges 24 and 26 are heat sealed together, completely about their peripheral extent, except for small slot-like ports or spaces 28 which are called "skip seals."

The materials of both the container 16 and the pack 14 are formed of relatively high shrink film. The film forming container 16 can, for example, comprise an oriented film of an interpolymer composed of at least 70 weight percent interpolymerized vinylidene chloride with the remainder of at least one monoethylenically unsaturated comonomer, the film exhibiting at least 30 percent shrinkage at 100° C. The comonomer could be vinyl chloride or acrylonitrile, for example. The film of container 16 might also comprise other highly shrinkable films such as a highly oriented low plasticized polyvinyl chloride film, or laminates or multilayered structures including such films. The film comprising packs 14 can, for example, comprise a highly irradiated film comprised of homopolymers or copolymers of olefins like ethylene, such as taught by U.S. Pats. Nos. 2,877,500, 3,022,543 and 3,245,407, which films exhibit at least 30 percent shrinkage at 100° C. Other films of like characteristics, such as a highly plasticized polyvinylchloride film, might also be employed as well as laminates or multilayered structures including such films.

The film employed in forming container 16 should also be effective (the total effect of all layers or plies if more than one) to keep the gas transmission rate of oxygen therethrough down in the range of from about 1 to 20 cc./100 square inches/24 hours/atmosphere (preferably less than 3 cc. or less), as measured in accordance with test method ASTM D1434–58, the thickness of the film notwithstanding. Such high barrier shrink films can be those formed from such resins as the polyamides, polyesters, polyimides, acrylonitriles, polyvinylchlorides, polyvinylchloride/vinylidene chlorides and certain rubber hydrochlorides like Goodyear Tire and Rubber Company's Pliofilm N–1. Also several laminated, coextruded and/or other combinations of films, or films and other materials, can provide high barrier characteristics, such as taught in U.S. Pat. No. Re. 24,992 and mentioned in French Pat. No. 1,484,153, for example, also to the extent such also exhibit the necessary high shrink capabilities.

The material forming packs 14 should also be a substantially clear, high oxygen permeable film, as well as being highly shrinkable. This is so the oxygen can reach the fresh meat 12 and convert the purplish red myoglobin to the bright red oxymyoglobin when the former is complexed with molecular oxygen. The breathable or oxygen permeable film of packs 14 should have an oxygen permeability or gas transmission rate greater than about 200 cc./100 square inches/24 hours/atmosphere, as measured in accordance with test method ASTM D1434–58, the thickness of the film notwithstanding. Films which are considered to be high breathing films of this nature can include, for example, films as described heretofore for packs 14. Especially useful are relatively low density highly oriented and irradiated polyethylene or ethylene copolymer films. Other shrink films which might also exhibit desirable permeability features could be certain rubber hydrochloride films like Goodyear Tire and Rubber Company's Pliofilm FM–1, certain cellulose films such as cellophane and cellulose acetate, certain polycarbonates, and highly oriented polystyrene films. The best film for fresh red meat will be one which transmits a desired quantity of oxygen per unit of time while suitable preventing substantial moisture loss and having relatively high shrinkability.

FIGURES 3 through 6 illustrate the applicants' packaging system employing the basic container 16 and individual packs 14. The meat is placed in packs 14 immediately after cutting from the normal carcass with minimum exposure to oxygen. This can be accomplished many ways, one of which is by flushing the package with other gases, such as nitrogen or carbon dioxide. This technique minimizes the conversion of the meat to the oxygenated state while it leads to increased potential in post blooming to the oxygenation state when the meat is re-exposed to air at the consumer or retail level.

A plurality of packs 14 are then inserted into container 16 (FIGS. 3 and 4) and a vacuum is drawn through the ports or spaces 28 of the packs 14 and the opening in container 16. The ports 28 of the packs 14 allow simultaneous withdrawal of gases out of the individual packs 14 and container 16 during this initial packaging operation. As soon as the drawing of the vacuum is completed, a clip 18 seals the opening of container 16 thereby excluding the possibility of air entering into the individual packs 14. The interior of container 16 can also be gas flushed at this time, if desired.

The container 16, with the packs 14 sealed therein, is then passed through a hot shrink bath to shrink the outer barrier bag 16, as illustrated in FIG. 5. This can be accomplished by a quick quench or heating. The cool meat 12 will limit heat transfer, under proper circumstances, substantially to the outer container only. This shrinking of container 16 serves to provide a tight package thereby reducing movement in the inner packs 14 therein and localizing the effect of any pin holes in the container 16. It also keeps the inner packs 14 tight around to meat 12 to prevent purging.

The package 10 is then shipped to the retailer or restaurant owner who maintains the packs 14 within the container 16 until he is ready to display the packs 14 for sale or use the same. At this time the individual packs 14 are removed from outer container 16 and the individual packs 14 are then post shrunk, as illustrated in FIG. 6. This post shrinking can be accomplished by passing the packs 14 through a heat shrink tunnel wherein the oxygen permeable packs become tightly wrapped about the meat. This post shrinking operation accomplishes several results. The heat increases the rate of oxygen transmission through the oxygen permeable film since oxygen transmission through such film increases with higher temperatures. It also increases the rate of oxidation of the meat since chemical reaction increases with increases in temperature. Thus the post shrinking operation substantially beneficially increases post bloom of the meat product, making the meat more quickly ready for display and sale. In addition, the post shrinking operation improves the appearance of the retail cut after it has been distorted during shipping. The ports 28 of the individual packs 14 are advantageous in allowing oxygen in during this post treatment stage.

It is conceivable that other variations to the present invention can occur without substantially differing from the basic concept here suggested. For example, an impermeable outer container can be a box that is vacuum or gas flushed. Inner bags can remain the same as those shown in items 14 in the drawing. They are tightly fitted with the box and the box is provided with means for permitting air to enter and/or escape out of the container quickly. Another alternative is to place the "skip seal" packs 14 in an oxygen chamber before post shrinking in order to hasten oxidation. A more rigid package such as a tray with lid can also be made with "skip seals" to allow transfer of gas during initial packaging and final blooming. It is also possible to provide a "skip seal" on packs 14 with a skirt beyond the seal so that it will fold back during shrink to help seal the container against juice leakage. Thus, while certain representative embodiments and details have been shown for the purpose of illustrating the invention, it will be apparent to those skilled in the art that various changes and modifications can be made therein without departing from the spirit and scope of the invention.

Accordingly, what is claimed as new is:

1. A method of packaging fresh meat comprising the steps of:
   (a) cutting portions of fresh meat from a carcass,
   (b) placing said meat in at least one pack comprised of oxygen permeable film generally immediately after such cutting, and closing said pack except for at least one evacuation port,
   (c) placing said pack within a container comprising substantially oxygen impermeable film, thereafter,
   (d) removing air from within said container and simultaneously from within said pack through said evacuation port to at least partially evacuate said container and pack,
   (e) hermetically closing tthe evacuated container while leaving said evacuation port in a state wherein the latter communicates between the interior and the exterior of said pack, and after shipping said packaged meat,
   (f) removing the pack from the container, and subjecting said pack to heat sufficient to post shrink the film of said pack into tight intimate relationship about the meat packaged therewithin.

2. The method of packaging fresh meat of claim 1 wherein said pack includes skip seal ports through its periphery permitting porting of gases into and out of said pack.

3. The method of packaging fresh meat of claim 1 wherein the material forming said container has an oxygen gas transmission rate no greater than about 20 cc./100 square inches/24 hours/atmosphere.

4. The method of packaging fresh meat of claim 1 wherein the film forming at least a significant part of said pack has an oxygen gas transmission rate greater than about 200 cc./100 square inches/24 hours/atmosphere.

5. The method of packaging fresh meat of claim 1 wherein the material of said pack is a relatively low density highly oriented and irradiated polyethylene film or ethylene copolymer film and the material comprising said container is a vinyl chloride/vinylidene chloride copolymer film.

6. The method of packaging fresh meat of claim 1 wherein said post shrinking is at least 30% of the pack's original size.

7. The method of packaging fresh meat of claim 1 wherein the film of said container is heat shrinkable, and wherein after said container is sealed closed, the container is subjected to a quick heat shrink which is insufficient to shrink substantially said pack contained therewithin.

8. The method of packaging fresh meat of claim 7 wherein the film of said container is heat shrinkable by at least 30 percent at 100° C.

References Cited

UNITED STATES PATENTS

| | | | |
|---|---|---|---|
| 2,633,284 | 3/1953 | Hoffett | 206—46 F |
| 3,574,642 | 4/1971 | Weinke | 99—174 |
| 3,222,191 | 12/1965 | Steiner | 99—174 |
| 3,228,168 | 1/1966 | Grindrod | 99—174 X |
| 3,351,265 | 11/1967 | Miller | 99/174 X |
| 2,772,172 | 11/1956 | Carson | 99—174 |
| 3,047,404 | 7/1962 | Vaughan | 99—107 X |
| 3,193,392 | 7/1965 | Lundquist | 99—174 |
| 3,330,668 | 7/1967 | Hiscock | 99—189 X |
| 3,393,077 | 7/1968 | Moreau | 99—189 X |

OTHER REFERENCES

The O. G. defenesive publication Titchenal et al., Def. Pub. of Ser. No. 742,410 filed July 3, 1968, published in 861 O.G. 1021 on Apr. 22, 1969.

FRANK W. LUTTER, Primary Examiner

R. HALPER, Assistant Examiner

U.S. Cl. X.R.

99—189